US011256097B2

(12) United States Patent
Tominaga et al.

(10) Patent No.: US 11,256,097 B2
(45) Date of Patent: Feb. 22, 2022

(54) IMAGE GENERATION APPARATUS, IMAGE DISPLAY SYSTEM, IMAGE GENERATION METHOD, AND COMPUTER PROGRAM

(71) Applicant: Sony Interactive Entertainment Inc., Tokyo (JP)

(72) Inventors: Takehiro Tominaga, Tokyo (JP); Ryuya Tachino, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/052,347

(22) PCT Filed: May 30, 2018

(86) PCT No.: PCT/JP2018/020850
§ 371 (c)(1),
(2) Date: Nov. 2, 2020

(87) PCT Pub. No.: WO2019/229906
PCT Pub. Date: Dec. 5, 2019

(65) Prior Publication Data
US 2021/0088793 A1    Mar. 25, 2021

(51) Int. Cl.
*G02B 27/01* (2006.01)
*G09G 3/3225* (2016.01)
*G09G 3/3208* (2016.01)
*G09G 5/00* (2006.01)
*G09G 5/38* (2006.01)

(52) U.S. Cl.
CPC .... *G02B 27/0172* (2013.01); *G02B 2027/014* (2013.01); *G02B 2027/0134* (2013.01); *G09G 3/3225* (2013.01)

(58) Field of Classification Search
USPC .............................................. 345/7
See application file for complete search history.

(56) References Cited

U.S. PATENT DOCUMENTS

| 9,628,766 | B2 | 4/2017 | Tamayama |
| 10,230,938 | B2 | 3/2019 | Kura |
| 10,303,244 | B2 | 5/2019 | Hashimoto |

(Continued)

FOREIGN PATENT DOCUMENTS

| JP | 2008281611 A | 11/2008 |
| JP | 2012186659 A | 9/2012 |

(Continued)

OTHER PUBLICATIONS

International Preliminary Report on Patentability and Written Opinion for corresponding PCT Application No. PCT/JP2018/020850, 12 pages, dated Dec. 10, 2020.

(Continued)

*Primary Examiner* — Chineyere D Wills-Burns
(74) *Attorney, Agent, or Firm* — Matthew B. Dernier, Esq.

(57) ABSTRACT

An HMD includes a display section and a lens. The display section includes organic light emitting diodes (OLEDs). The lens enlarges an image displayed on the display section and presents the enlarged image to a user. A PC generates an image of a virtual space. The PC generates an image to be displayed on the display section by correcting an image obtained by shifting the generated virtual space image according to distortion caused by the lens.

9 Claims, 8 Drawing Sheets

(56) References Cited

U.S. PATENT DOCUMENTS

| | | | |
|---|---|---|---|
| 10,607,417 B2 | 3/2020 | Sasaki | |
| 2010/0079356 A1* | 4/2010 | Hoellwarth | G02B 27/0093 |
| | | | 345/8 |
| 2013/0336631 A1* | 12/2013 | Kura | G09G 5/006 |
| | | | 386/230 |
| 2014/0071025 A1* | 3/2014 | Lee | G02B 27/123 |
| | | | 345/8 |
| 2015/0009416 A1* | 1/2015 | Tamayama | H04N 13/366 |
| | | | 348/746 |
| 2015/0293644 A1* | 10/2015 | Watanabe | G06F 3/017 |
| | | | 345/168 |
| 2016/0328882 A1* | 11/2016 | Lee | G02B 27/0172 |
| 2016/0349514 A1* | 12/2016 | Alexander | G02B 27/0093 |
| 2017/0351325 A1 | 12/2017 | Hashimoto | |
| 2018/0047332 A1 | 2/2018 | Kuwahara | |
| 2018/0067306 A1* | 3/2018 | Wilson | G02B 17/086 |
| 2018/0204375 A1* | 7/2018 | Baek | G06T 19/006 |
| 2018/0329215 A1* | 11/2018 | Kake | G06F 3/0346 |
| 2019/0164354 A1* | 5/2019 | Sasaki | G02B 27/0101 |

FOREIGN PATENT DOCUMENTS

| | | |
|---|---|---|
| JP | 2017220032 A | 12/2017 |
| JP | 2018072992 A | 5/2018 |
| WO | 2013125138 A1 | 8/2013 |
| WO | 2017212679 A1 | 12/2017 |

OTHER PUBLICATIONS

International Search Report for corresponding PCT Application No. PCT/JP2018/020850, 4 pages, dated Aug. 28, 2018.

* cited by examiner

ENTERTAINMENT SYSTEM 100

IMAGE GENERATION APPARATUS, IMAGE DISPLAY SYSTEM, IMAGE GENERATION METHOD, AND COMPUTER PROGRAM

TECHNICAL FIELD

The present invention relates to a data processing technology, and more particularly, to an image generation apparatus, an image display system, an image generation method, and a computer program.

BACKGROUND ART

A head-mounted display (hereinafter referred to as an HMD) is worn on a user's head to provide the user with a world of virtual reality (VR). In recent years, applications have come along that allow users to play games while at the same time watching a screen displayed on the HMD. In a conventional stationary display such as a TV set, a user's field of view spreads beyond the screen, making it occasionally difficult for the user to concentrate on the screen, thus resulting in lack of immersive sensation. In that respect, when putting on an HMD, the user sees only a video displayed on the HMD, thus enhancing the immersive sensation into the video world and providing an effective way of further increasing the entertaining nature of the game.

CITATION LIST

Patent Literature

[PTL 1] Japanese Patent Laid-Open No. 2017-220032

SUMMARY

Technical Problem

HMDs often employ organic light emitting diodes (hereinafter also referred to as an OLED) offering light weight and fast response speed. On the other hand, OLEDs have a drawback in that they significantly deteriorate over time. For example, a portion thereof that has been shining bright for long hours may deteriorate in a peculiar manner and also develop what is called burn-in.

The present invention has been devised in light of the above problem, and it is an object of the present invention to provide a technology for suppressing deterioration of display elements in a head-mounted display.

Solution to Problem

In order to solve the above problem, an image generation apparatus of an aspect of the present invention generates an image to be displayed on a head-mounted display, and the head-mounted display includes a display section and a lens. The display section includes organic light emitting diodes. The lens enlarges an image displayed on the display section and presents the enlarged image to a user. The image generation apparatus includes a first generation section and a second generation section. The first generation section generates an image of a virtual space. The second generation section generates an image to be displayed on the display section by correcting an image obtained by shifting the image generated by the first generation section according to distortion caused by the lens.

Another aspect of the present invention is an image display system. This image display system displays an image on a head-mounted display. The head-mounted display includes a display section that includes organic light emitting diodes. The image display system includes a first processing section and a second generation section. The first processing section generates an image of a virtual space. The second processing section displays the virtual space image on the display section. The second generation section generates an image to be displayed on the display section by shifting the image generated by the first processing section or displays the image generated by the first processing section on the display section in a shifted manner according to whether or not at least one of three conditions, that is, (1) an operating state of the head-mounted display, (2) an image displayed on the head-mounted display, and (3) a state of the user using the head-mounted display, is met.

Still another aspect of the present invention is an image display system. This image display system displays an image on a head-mounted display, and the head-mounted display includes a display section that includes organic light emitting diodes. The image display system includes a detection section, a first processing section, and a second generation section. The detection section detects a direction of line of sight of a user wearing the head-mounted display. The first processing section generates an image of a virtual space. The second processing section displays the virtual space image on the display section. The second generation section corrects the image generated by the first processing section in a manner suppressing deterioration of the organic light emitting diodes according to the direction of user's line of sight detected by the detection section or displays the image generated by the first processing section on the display section in a manner suppressing deterioration of the organic light emitting diodes.

Still another aspect of the present invention is an image generation method. This method generates an image to be displayed on a head-mounted display, and the head-mounted display includes a display section and a lens. The display section includes organic light emitting diodes. The lens enlarges an image displayed on the display section and presents the enlarged image to a user. A computer performs a first step of generating an image of a virtual space and a second step of generating an image to be displayed on the display section by correcting an image obtained by shifting the image generated by the first step according to distortion caused by the lens.

It should be noted that any combination of the above components and conversion of the expression of the present invention between an apparatus, a method, a system, a program, a recording medium storing a program, and so on are also effective as an embodiment of the present invention.

Advantageous Effect of Invention

The present invention suppresses deterioration of display elements in a head-mounted display.

DESCRIPTION OF EMBODIMENTS

First Embodiment

Figure 1:
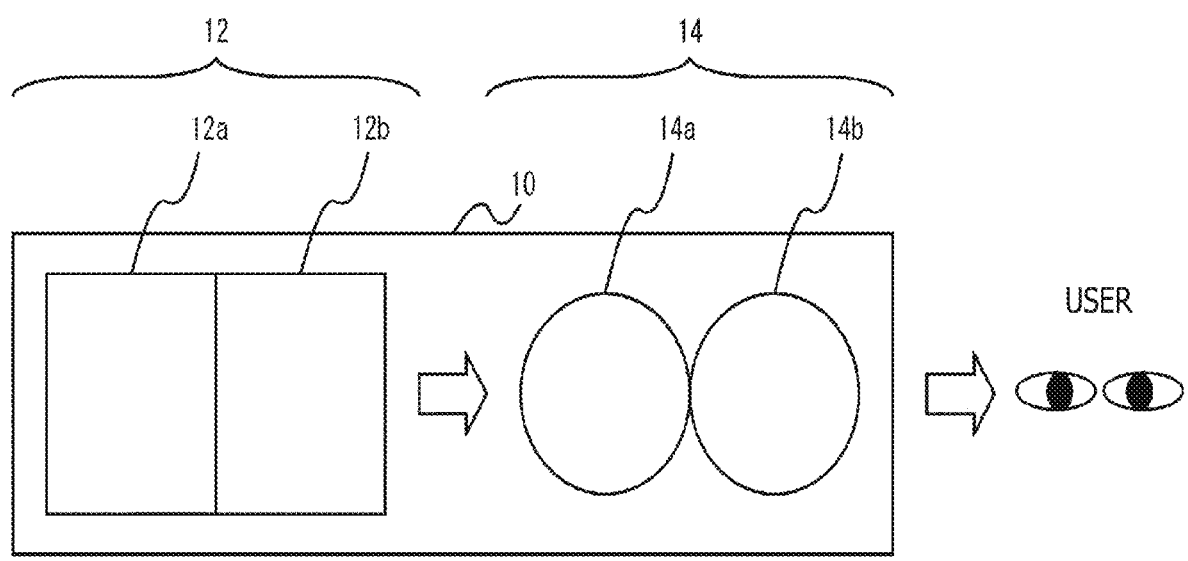
FIG. 1 is a diagram schematically illustrating a configuration of an HMD.

FIG. 1 schematically illustrates a configuration of an HMD 10. The HMD 10 includes a left OLED panel 12a and a right OLED panel 12b that are collectively referred to as an OLED panel 12 and a left lens 14a and a right lens 14b that are collectively referred to as a lens 14. The OLED panel 12 can also be said to be an organic electroluminescence (EL) panel, and a large number of OLEDs are provided as display elements (light-emitting elements). The left OLED panel 12a includes a screen for displaying an image to be presented to the user's left eye (hereinafter, a "left eye image"), and the right OLED panel 12b includes a screen for displaying an image to be presented to the user's right eye (hereinafter, a "right eye image").

The left lens 14a and the right lens 14b are, for example, convex lenses. The left lens 14a enlarges a left eye image displayed on the left OLED panel 12a and presents the enlarged image to the user. The right lens 14b enlarges a right eye image displayed on the right OLED panel 12b and presents the enlarged image to the user. As a result, a large viewing angle is provided to the user. Also, parallax is established between the left and right eye images, thus providing the user watching the left and right eye images at the same time with a stereoscopic sensation.

In order to reduce manufacturing costs of the HMD 10, the lens 14 uses relatively inexpensive lenses and, therefore, have chromatic aberration. Also, a distortion level varies depending on a position through which the lens 14 light passes and a color of the light. For example, the closer to the lens edge, the greater the distortion, and the distortion level varies with each of red, green, and blue. For this reason, an image (hereinafter also referred to as a "corrected image") obtained by correcting an original image depicting what a virtual space should look like in such a manner as to cancel the lens distortion (also referred to as a reverse distortion correction), is displayed on the OLED panel 12 of the HMD 10.

Figure 2:
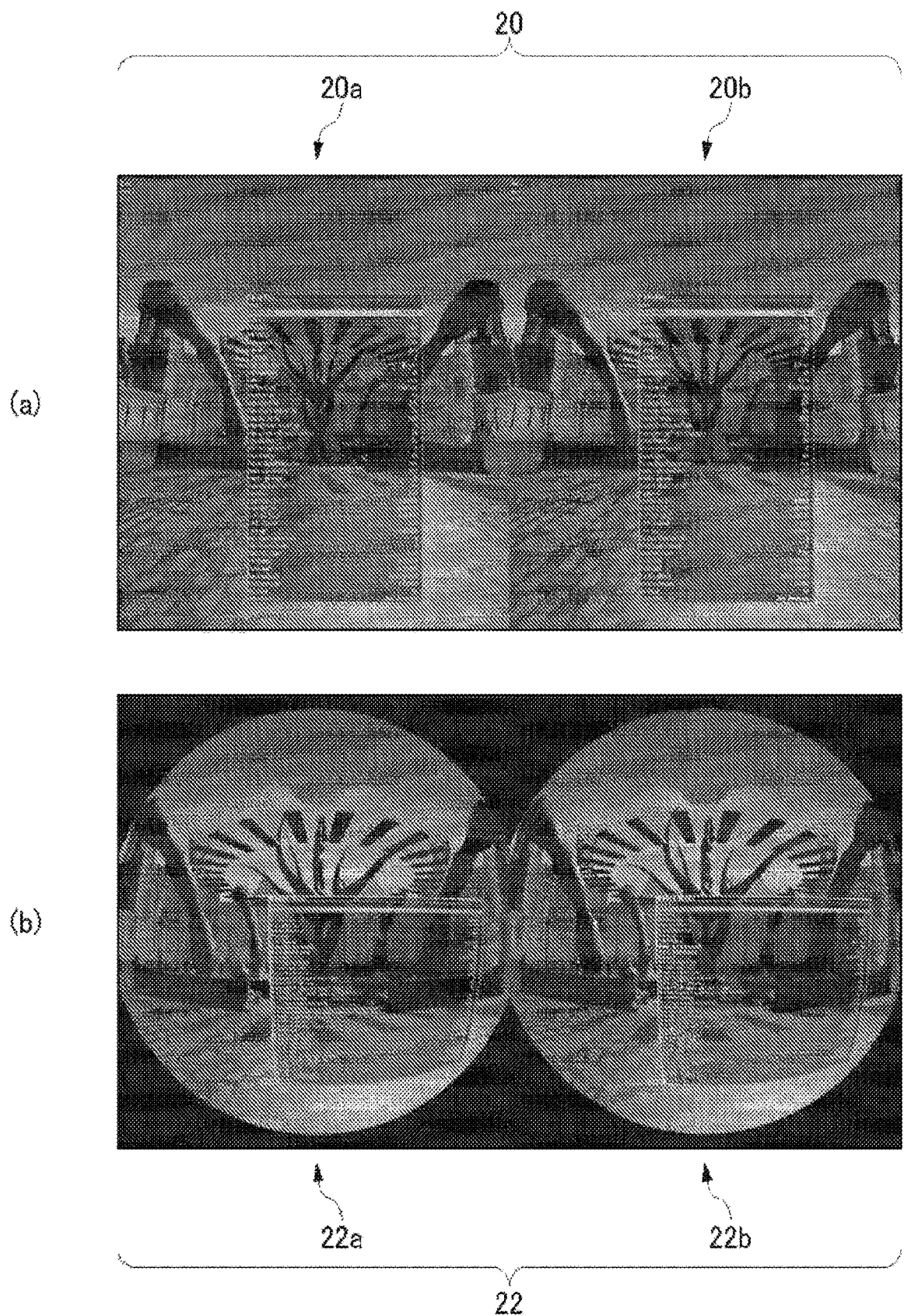
FIG. 2(*a*) is a diagram illustrating an example of an original image, and FIG. 2(*b*) is a diagram illustrating a corrected image.

FIG. 2(a) illustrates an example of an original image, and FIG. 2(b) illustrates a corrected image. An original image 20 illustrates what the virtual space to be viewed by the user should look like and includes a left original image 20a to be presented to the user's left eye and a right original image 20b to be presented to the user's right eye. A corrected image 22 includes a left corrected image 22a obtained by correcting the left original image 20a according to distortion caused by the left lens 14a and a right corrected image 22b obtained by correcting the right original image 20b according to distortion caused by the left lens 14a. The left corrected image 22a corresponds to the left eye image, and the right corrected image 22b corresponds to the right eye image.

When viewed through the left lens 14a by the user, the left corrected image 22a displayed on the left OLED panel 12a appears to the user's eye like the left original image 20a. Also, when viewed through the right lens 14b by the user, the right corrected image 22b displayed on the right OLED panel 12b appears to the user's eye like the right original image 20b. Hereinafter, unless otherwise specified, processes regarding the original images 20 include those regarding the left original image 20a and the right original image 20b.

Figure 3:
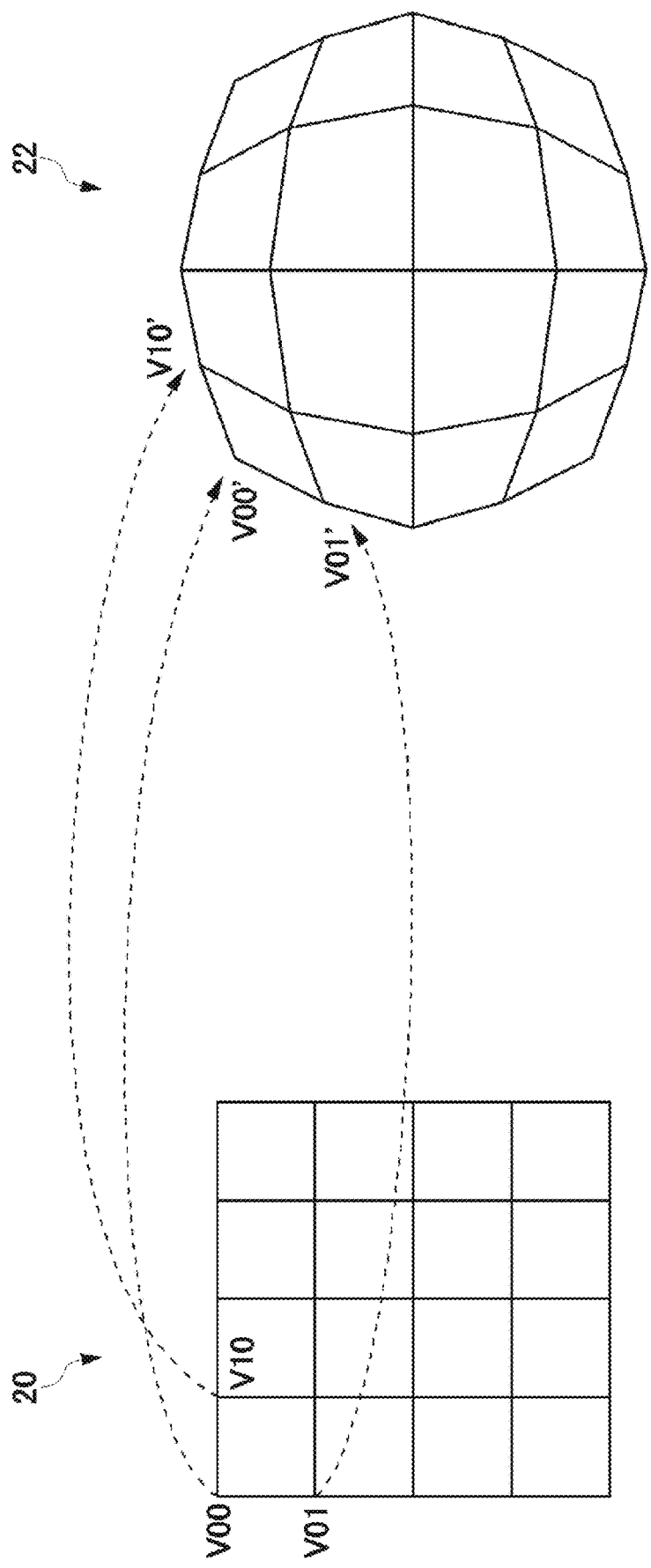
FIG. 3 is a diagram illustrating an example of a correction process.

FIG. 3 illustrates an example of a correction process. For example, the correction process divides the original image 20 into a plurality of grid-patterned regions (also referred to as "polygons") and generates the corrected image 22 by deforming the plurality of these regions into any rectangle. An image generation apparatus (e.g., GPU (Graphics Processing Unit)) draws the corrected image 22 by changing coordinates of each of vertices of the polygons to which textures have been attached. It should be noted that in the case where the coordinates of each vertex are changed, a known deformation process is performed on the textures attached to the polygons.

The respective positions of the original image 20 may be associated with the respective positions of the corrected image 22 in advance. Alternatively, a function may be established that accepts the coordinates of the original image 20 as input and outputs the coordinates of the corresponding corrected image 22. The image generation apparatus sets a pixel value of a vertex V00 of the original image 20 as a pixel value of V00' of the corresponding corrected image 22. Also, the image generation apparatus sets a pixel value of a vertex V01 of the original image 20 as a pixel value of V01' of the corresponding corrected image 22. Also, the image generation apparatus sets a pixel value of a vertex V10 of the original image 20 as a pixel value of V10' of the corresponding corrected image 22. It should be noted that the lens 14 varies in distortion from one color to another. In reality, therefore, the correction process may be performed for each color of the original image 20 (e.g., for each of red, green, and blue components).

The correction process may scale up or down the original image 20 for each region and move a vertex by a width smaller than one pixel. In that case, interpolation may be performed by using a known technique such as a bilinear filter. For example, considering a case where luminance values of three pixels arranged side by side are "0, 1, 0," in the case of a two-fold scaleup, a row of luminance values of five pixels may be set to "0, 0.5, 1, 0.5, 0" by obtaining mean luminance values of adjacent pixels. Also, in the case of a three-fold scaleup, a row of luminance values of seven pixels may be set to "0, 0.33, 0.66, 1, 0.66, 0.33, 0" by obtaining weighted means.

The process in the case of moving the vertices of the original image 20 will be depicted. In the case of movement by one pixel, a three-fold scaleup result may be shifted in phase by '3' first followed by extraction of every third luminance value. In this case, the row of luminance values is "1, 0, N/A." Also, in the case of movement by ⅔ of a pixel, a three-fold scaleup result may be shifted in phase by '2' first followed by extraction of every third luminance value. In this case, the row of luminance values is "0.66, 0.33, 0." Also, in the case of movement by ⅓ of a pixel, a three-fold scaleup result may be shifted in phase by 1 followed by extraction of every third luminance value. In this case, the row of luminance values is "0.33, 0.66, 0."

Incidentally, OLEDs as display elements (which can also be said to be light-emitting elements) in the HMD 10, have a drawback in that they significantly deteriorate over time. For example, a portion thereof that has been shining bright for long hours may deteriorate in a peculiar manner and also develop what is called burn-in. Recent years have seen the use of a technology called "wobbling" to suppress OLED deterioration. In an OLED TV (also called an organic EL TV), for example, an image display position may be shifted in units of a pixel as wobbling.

Figure 4:
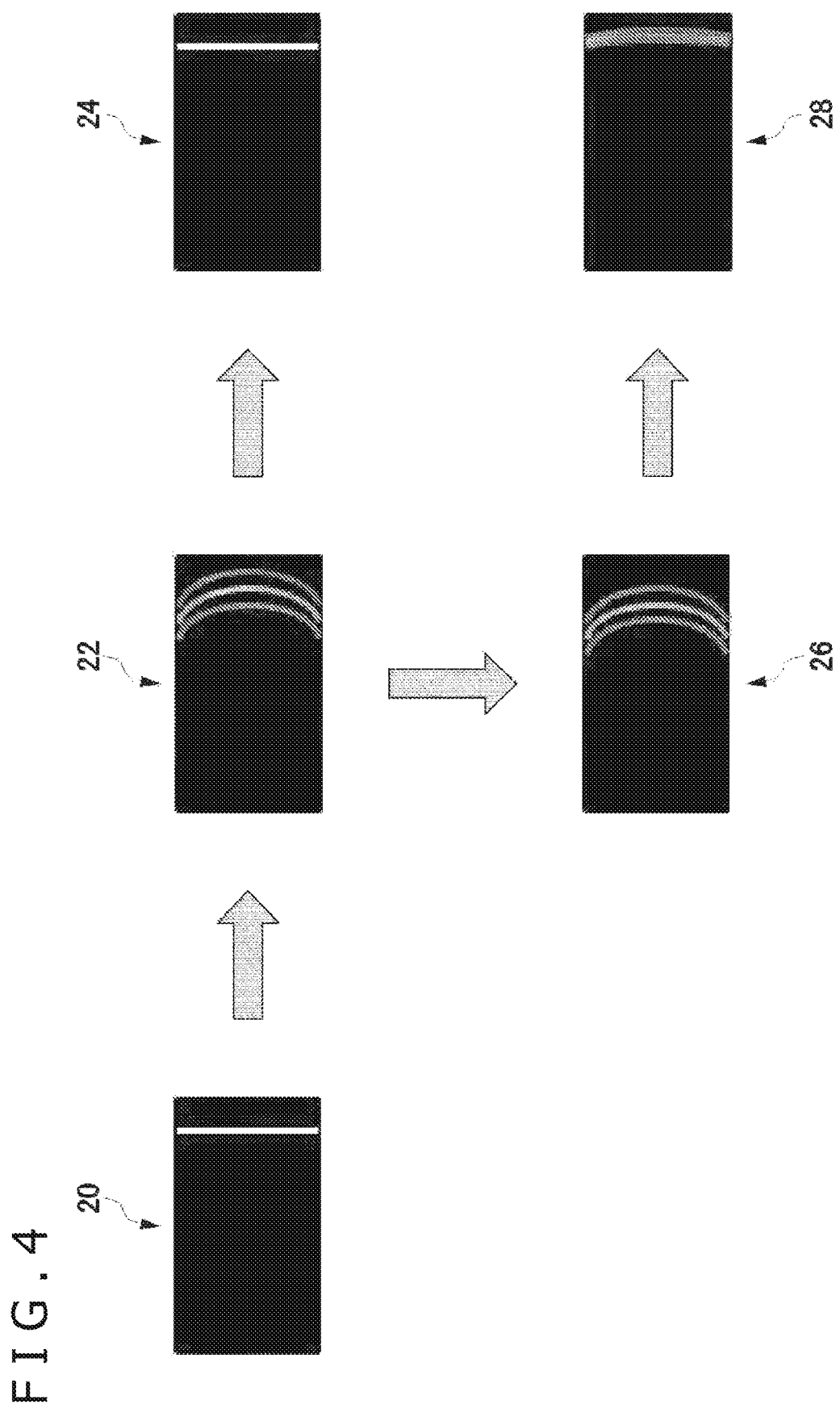
FIG. 4 is a diagram describing a problem.

However, shifting the display position of an image when displaying the image on the OLED panel 12 of the HMD 10 as in wobbling may cause a problem. FIG. 4 is a diagram describing the problem. Although the manner in which distortion occurs varies depending on through which portion of the lens 14 light emitted from the OLED panel 12 passes, the reverse distortion correction has been performed on the corrected image 22 displayed on the OLED panel 12 with this as a premise. The corrected image 22 in FIG. 4 depicts the results of the reverse distortion correction for red, green, and blue. In the corrected image 22 of FIG. 4, a blue line, a green line, and a red line, as components of a white line in FIG. 20, are arranged side by side from left. As a result of distortion of light emitted from the OLED panel 12 that displays the corrected image 22, by the lens 14, the user views an image 24 depicting a white line (i.e., the same details as the original image 20).

Conventional wobbling shifts the display position of the corrected image 22, that is, displays the image 26 that differs in display positions of the blue, green, and red lines from the corrected image 22. The portion of the lens 14 through which light (red, green, and blue) emitted from the OLED panel 12 that displays the image 26 passes differs from the portion of the lens 14 through which light (red, green, and blue) emitted from the OLED panel 12 that displays the corrected image 22 passes. As a result, the corrected image 22 looks differently from the original image 20 through the lens 14. For example, the corrected image 22 is viewed like an image 28. In the image 28, the blue line, the green line, and the red line do not overlap completely, thus resulting in color drift.

For this reason, the image generation apparatus of the first embodiment (personal computer (PC) 40 which will be described later) shifts the pre-correction original image 20 extremely slightly (e.g., by one pixel). Then, the image generation apparatus generates the corrected image 22 by performing the reverse distortion correction on the result of shifting the original image 20. When viewed through the lens, the corrected image 22 appears to the user like an image obtained by shifting the original image 20 extremely slightly. That is, the configuration of the first embodiment shifts a peak position of brightness of the corrected image 22, thus preventing extreme deterioration of the OLEDs at specific positions and suppressing the degradation of image quality (e.g., color drift illustrated in the image 28 of FIG. 4).

Figure 5:
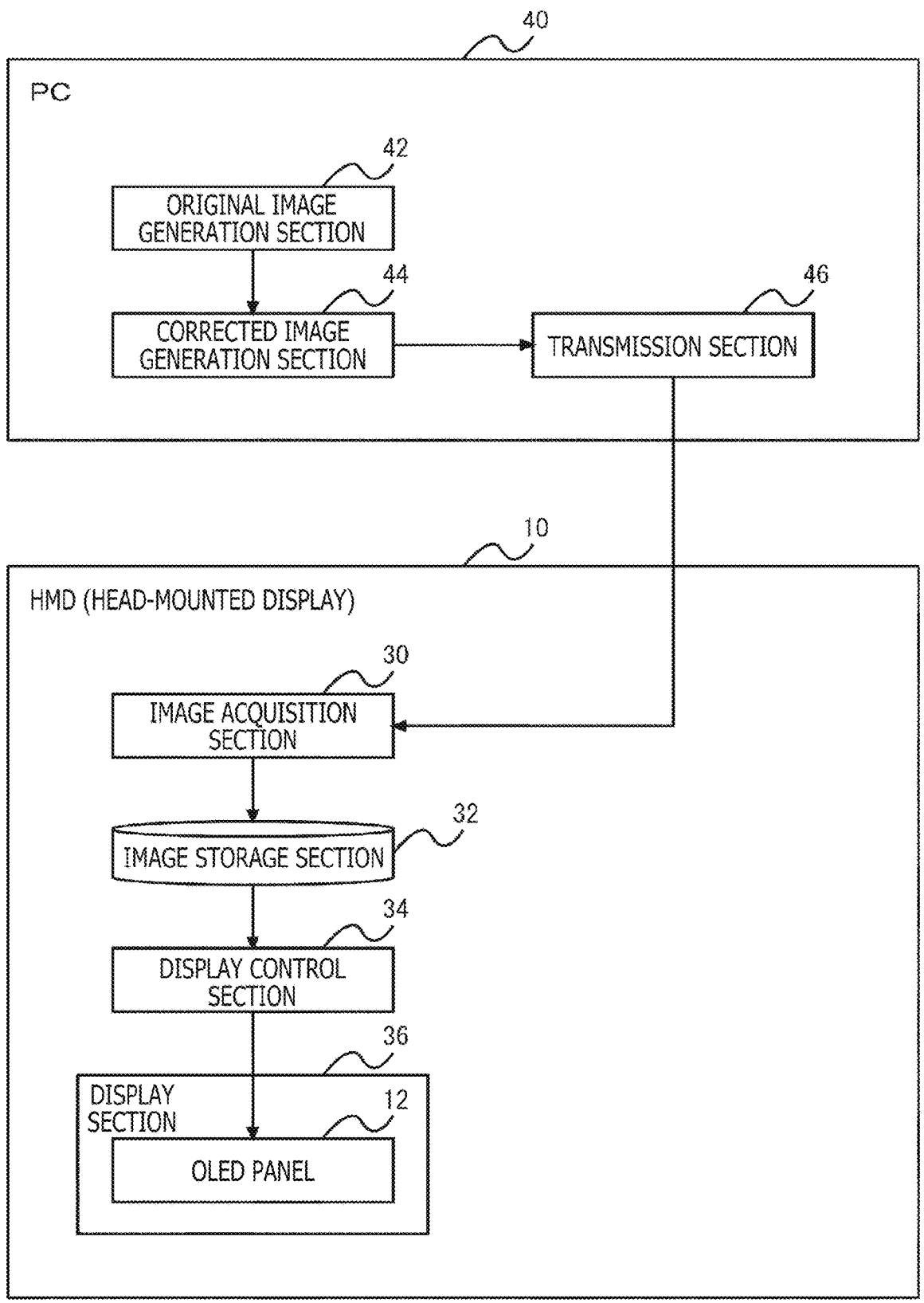
FIG. 5 is a diagram illustrating a configuration of an entertainment system of a first embodiment.

FIG. 5 is a diagram illustrating a configuration of an entertainment system 100 of the first embodiment. The entertainment system 100 includes the HMD 10 and the PC 40. The PC 40 is an information processing apparatus that includes functionality of an image generation apparatus for generating an image to be displayed on the HMD 10. The information processing apparatus as an image generation apparatus is not limited to the PC 40 and may be a gaming console, a smartphone, a tablet terminal, and so on.

In the first embodiment, the PC 40 performs an image generation process of suppressing the deterioration of OLEDs, thus eliminating the need for wobbling-related functionality in the HMD 10. That is, the HMD 10 of the first embodiment may be a known HMD that uses OLEDs as its display elements. The HMD 10 and the PC 40 may be connected by HDMI (High-Definition Multimedia Interface) (registered trademark).

FIG. 5 includes a block diagram illustrating functional blocks of the HMD 10. The HMD 10 includes an image acquisition section 30, an image storage section 32, a display control section 34, and a display section 36. Each of the blocks illustrated in the block diagram of the present specification is realized, in terms of hardware, by not only elements and electronic circuitry including computer's central processing unit (CPU) and memory but also mechanical apparatus, and, in terms of software, by computer programs and so on. Here, the functional blocks realized by coordination therebetween are depicted. Therefore, it is understood by those skilled in the art that these functional blocks can be realized in various ways by a combination of hardware and software.

A storage of the HMD 10 may store a computer program (e.g., image display software) that includes a plurality of modules corresponding to the image acquisition section 30 and the display control section 34. A CPU or GPU of the HMD 10 may read the computer program into a main memory for execution, thus delivering the functionality of the image acquisition section 30 and the display control section 34.

The display section 36 includes an OLED panel 12. The image acquisition section 30 receives data of the image (corrected image 22 in the first embodiment) sent from the PC 40. The image acquisition section 30 stores the received data of the corrected image 22 in the image storage section 32. The display control section 34 displays, on the OLED panel 12, the data of the corrected image stored in the image storage section 32.

FIG. 5 includes a block diagram of the functional blocks of the PC 40. The PC 40 includes an original image generation section 42, a corrected image generation section 44, and a transmission section 46. The storage of the PC 40 may store a computer program (e.g., image generation application such as a VR game) that includes a plurality of modules corresponding to the plurality of these functional blocks. The CPU or GPU of the PC 40 may read the computer program into the main memory for execution, thus delivering the functionality of the plurality of functional blocks.

The original image generation section 42, as a first generation section, generates the original image 20 that depicts what a virtual space to be presented to the user looks like according to the progress of the game and so on. The corrected image generation section 44, as a second generation section, generates the corrected image 22 to be displayed on the OLED panel 12 of the HMD 10 by correcting (performing a reverse distortion correction on) an image obtained by shifting the original image 20 generated by the original image generation section 42 according to distortion caused by the lens 14. The transmission section 46 sends the data of the corrected image 22, generated by the corrected image generation section 44, to the HMD 10, displaying the corrected image 22 on the OLED panel 12 of the HMD 10.

The corrected image generation section 44 changes the width by which to shift the original image 20 (amount of shift) at a preset timing. The shift width at a certain timing may be one pixel, and the corrected image generation section 44 may change the shift width every frame. The shift direction may be a predetermined direction or a plurality of predetermined directions and may be determined randomly when the corrected image 22 is generated. The above timing may be one relative to the number of images and may be, for example, a case where the preset number of corrected images 22 are generated. Also, the above timing may be one relative to time and may be, for example, a case where a predetermined amount of time has elapsed.

Also, the corrected image generation section 44 may alternately repeat two processes, that is, (1) generating the corrected image 22 by performing the reverse distortion correction on the original image 20 without shifting the original image 20 (shift width=0) and (2) generating the corrected image by performing the reverse distortion correction on the result of shifting the original image 20 by one pixel at a time in a preset direction. In other words, the corrected image generation section 44 may switch between (1) and (2) each time the original image 20 is input, that is, each time the corrected image 22 is generated.

Also, the corrected image generation section 44 may generate a display image to be displayed at a first display timing by performing the reverse distortion correction on the original image 20 generated at a first generation timing. The corrected image generation section 44 may generate a display image to be displayed at a second display timing different from the first display timing by performing the reverse distortion correction on an image obtained by shifting the image generated at a second generation timing different from the first generation timing. Further, also, the corrected image generation section 44 may periodically switch between correction of the original image 20 and correction of the image obtained by shifting the original image 20.

The corrected image generation section 44 of the first embodiment sets the pixel value of a certain position in the original image 20 as a pixel value of the position in the corrected image 22 corresponding to the position moved in the direction of shift from the certain position according to a correspondence determined in advance according to distortion caused by the lens 14 between the position in the original image 20 and the position in the corrected image 22. Although partially described earlier in relation to FIG. 3, in the case where the original image 20 is not shifted, the corrected image generation section 44 may, as a known process, input source coordinates of the original image 20 into a function that defines the correspondence and acquire destination coordinates of the corrected image 22 as an output of the function. Then, the corrected image generation section 44 may set the pixel value of the source coordinates of the original image 20 as a pixel value of the destination coordinates of the corrected image 22.

On the other hand, in the case where the original image 20 is shifted, the corrected image generation section 44 may input, to the function defining the above correspondence, a value added with an offset that specifies the width by which to shift the original image 20 in a preset direction relative to the source coordinates of the original image 20 and acquire, as an output of the function, destination coordinates of the corrected image 22 corresponding to the coordinate values of (the source coordinates+the offset). Then, the corrected image generation section 44 may set the pixel value of the source coordinates of the original image 20 as a pixel value of the destination coordinates of the corrected image 22. This makes it possible to generate the corrected image 22 corresponding to the image obtained by shifting the original image 20 in a preset direction. This configuration simply adds an offset to the source coordinates of the original image 20, thus suppressing the increase in number of calculations, in other words, nearly eliminating the increase in number of calculations.

Also, the corrected image generation section 44 may shift the original image by any width, and the width by which to shift the original image 20 may not be a length of an integer multiple of one pixel. As partially described earlier in relation to FIG. 3, the corrected image generation section 44 may generate the corrected image 22 by performing the reverse distortion correction on the image obtained by shifting the original image 20 by a width of less than one pixel through a known technology such as a bilinear filter. The smaller the width by which the image is shifted, the lower the efficacy of suppressing the deterioration of the OLEDs of the HMD 10. However, the user is less likely to feel a sense of discomfort even in the case of a low resolution (i.e., pixel density) of the OLED panel 12.

The entertainment system 100 of the first embodiment changes the peak position of brightness of the corrected image 22, thus preventing concentrated occurrence of deterioration at a specific location (specific OLEDs) of the OLED panel 12. In other words, the pre-correction original image 20 is shifted vertically and horizontally according to aberration distortion of the lens 14, thus suppressing images from being displayed in a fixed manner at a specific location of the OLED panel 12 (a high luminance state continues at a specific location) and preventing peculiar deterioration of OLEDs at specific positions. Also, the entertainment system 100 of the first embodiment can prevent the degradation of image quality (e.g., color drift) caused by shifting of the display position of the corrected image 22.

The present invention has been described above on the basis of the first embodiment. This first embodiment is illustrative, and it is understood by those skilled in the art that the combination of components and processes can be modified in various ways and that such modification examples also fall within the scope of the present invention.

Second Embodiment

Figure 6:
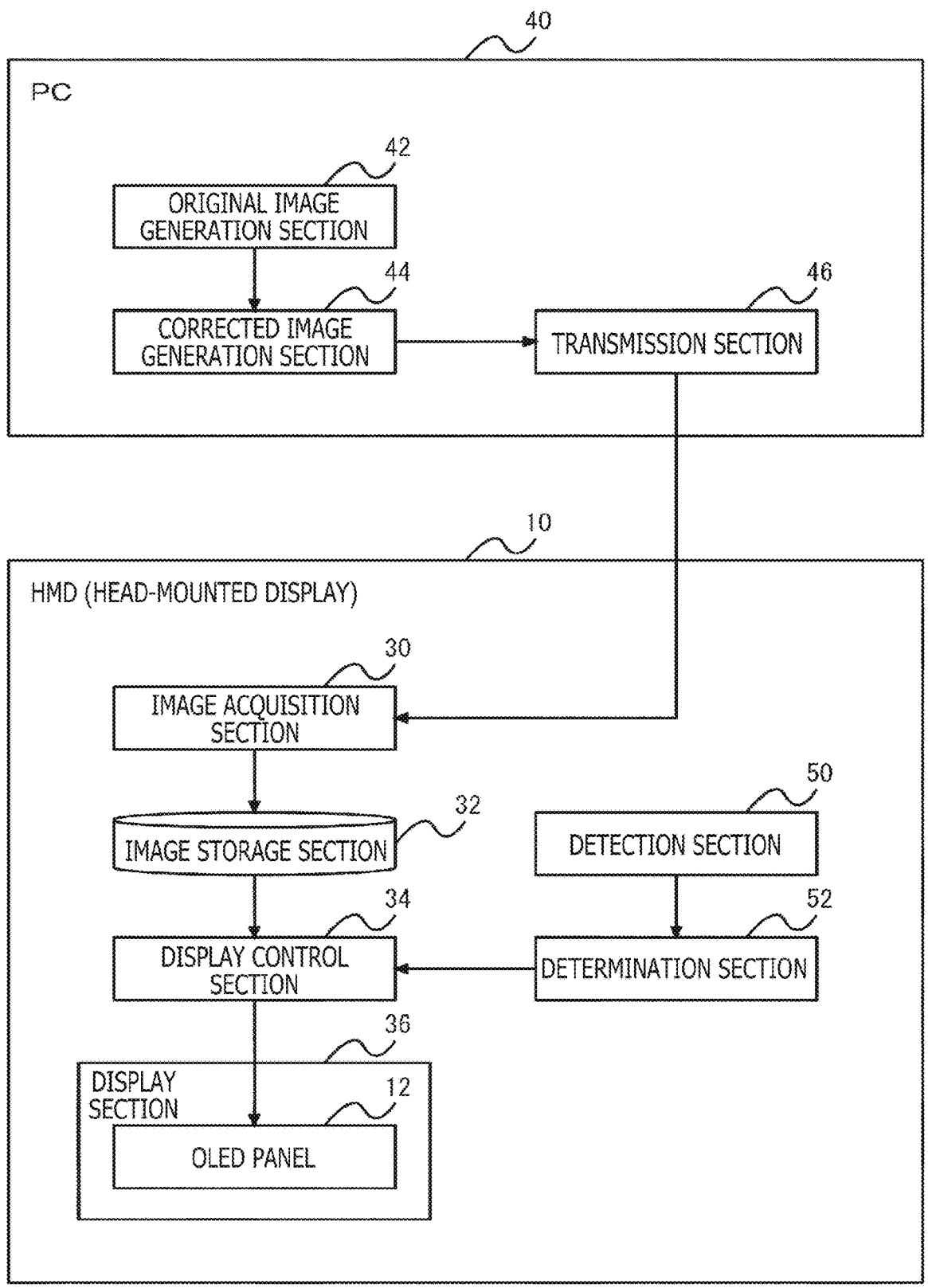
FIG. 6 is a diagram illustrating a configuration of the entertainment system of a second embodiment.

In a second embodiment, a description will be given of another configuration for suppressing the deterioration of OLEDs of the HMD 10. FIG. 6 illustrates a configuration of the entertainment system 100 of the second embodiment. Of the components of the entertainment system 100 of the second embodiment, those identical or corresponding to the components of the entertainment system 100 of the first embodiment are denoted by the same reference numerals as the first embodiment. Also, redundant description of details that have already been described in the first embodiment will be omitted as appropriate.

The PC 40 of the second embodiment includes the original image generation section 42, the corrected image generation section 44, and the transmission section 46 as does the PC 40 of the first embodiment. The original image generation section 42 generates the original image 20 as a first generation section. The corrected image generation section 44 generates the corrected image 22 obtained by correcting the original image 20 according to distortion caused by the lens. It should be noted, however, that the corrected image generation section 44 of the second embodiment generates the corrected image 22 through the reverse distortion correction of the original image 20 without shifting the original image 20. The reason for this is that the original image 20 is shifted on the side of the image display apparatus (HMD 10) as will be described later. The transmission section 46 sends the corrected image 22 to the HMD 10.

The HMD 10 of the second embodiment further includes a detection section 50 and a determination section 52 in addition to the functional blocks of the first embodiment. The detection section 50 detects, by a known technique, at least one of the following three conditions, that is, (1) the operating state of the HMD 10, (2) the image displayed on the HMD 10, and (3) the state of the user using the HMD 10. In the embodiment, all three conditions (1) to (3) are detected.

As for (1) the operating state of the HMD 10, for example, in the case where the power of the HMD 10 is switched from on to off or from off to on, the detection section 50 may detect this in cooperation with a power supply section (not depicted) of the HMD 10. Alternatively, as for (2) the image displayed on the HMD 10, in the case where an image is displayed with a mean luminance across the screen equal to or lower than a predetermined value (e.g., in the case where a completely black image is displayed, in other words, in the case where the screen turns completely black), the detection section 50 may detect this in cooperation with the display control section 34.

Also, as for (3) the state of the user using the HMD 10, in the case where the user is not wearing the HMD 10, the detection section 50 detects this on the basis of a detection result of a sensor (not depicted) provided in the HMD 10 and/or an image captured by a camera (not depicted) for imaging the HMD 10. Also, in the case where the user wearing the HMD 10 swings his or her head vigorously, in other words, in the case where the HMD 10 changes its posture (the user's head posture changes) to an extent greater than a predetermined threshold, the detection section 50 detects this.

The determination section 52 determines, according to the detection results of the detection section 50, whether or not each of a first image shifting condition regarding the operating state of the HMD 10, a second image shifting condition regarding the image displayed on the HMD 10, and a third image shifting condition regarding the state of the user using the HMD 10 is met. In the case where at least one of the first, second, and third image shifting conditions is met, the determination section 52 decides to perform an image shifting process (i.e., a wobbling process).

Specifically, in the case where the power of the HMD 10 is switched from on to off, or in the case where the power of the HMD 10 is switched from off to on, the determination section 52 determines that the first image shifting condition is met. Also, in the case where the mean luminance of the entire image is equal to or lower than a predetermined value, the determination section 52 determines that the second image shifting condition is met. Also, in the case where the user is not wearing the HMD 10, the determination section 52 determines that the third image shifting condition is met. Also, in the case where the HMD 10 changes its posture to an extent greater than the predetermined threshold, the determination section 52 determines that the third image shifting condition is met.

The display control section 34 displays the image stored in the image storage section 32 (i.e., the corrected image 22 generated by the PC 40) at the display position where the image should be displayed unless the determination section 52 decides to perform the image shifting process. For example, the image stored in the image storage section 32 may include coordinates of each pixel and pixel values (e.g., red, green, and blue component values). The display control section 34 may cause the OLED at the position corresponding to the coordinates of a certain pixel to emit light in a manner proportional to the pixel value of the pixel.

On the other hand, in the case where the determination section 52 decides to perform the image shifting process, the display control section 34 displays, as a second processing section, the image stored in the image storage section 32 (the image to be displayed next) on the OLED panel 12 in a shifted manner at the time of image display. The display control section 34 may perform a known wobbling process on the corrected image 22 to be displayed at a point of time when the determination section 52 decides to perform the image shifting process and beyond. For example, the display control section 34 may display the corrected image 22 at a position shifted by one pixel vertically or horizontally from the display position where the image should be displayed. For example, the display control section 34 may cause the OLED at the screen position shifted in a given direction from the screen position corresponding to the coordinates of a certain pixel of the corrected image 22 to emit light in a manner proportional to the pixel value of the pixel.

The entertainment system 100 of the second embodiment can perform a process of suppressing the deterioration of OLEDs of the HMD 10 at a suitable timing. For example, the entertainment system 100 can perform wobbling at a timing not readily noticeable by the user and suppress the user from feeling a sense of discomfort during wobbling.

The present invention has been described above on the basis of the second embodiment. This second embodiment is illustrative, and it is understood by those skilled in the art that the combination of components and processes can be modified in various ways and that such modification examples also fall within the scope of the present invention.

A first modification example of the second embodiment will be described. In the case where the determination section 52 does not decide to perform the image shifting process, the display control section 34 may display, on the OLED panel 12, the image stored in the image storage section 32 (the corrected image 22) in a manner shifted to a lesser extent than in the case where the determination section 52 decides to perform the image shifting process. For example, in the case where the determination section 52 decides to perform the image shifting process, the display control section 34 displays the corrected image 22 in a manner shifted in a given direction by two pixels. On the other hand, in the case where the determination section 52 does not decide to perform the image shifting process, the display control section 34 displays the corrected image 22 in a manner shifted in a given direction by one pixel.

A second modification example of the second embodiment will be described. The detection section 50 of the HMD 10 may detect the direction of user's line of sight by a known technique (e.g., Gaze Tracking technology) and may further detect other information associated with the direction of line of sight. For example, the HMD 10 may further include a camera for capturing images of user's pupils. The detection section 50 may detect blinking and shutting of eyes of the user. Further, also, the detection section 50 may detect regions of the OLED panel 12 viewed by the user and those not viewed by the user according to the direction of user's line of sight.

The display control section 34 of the HMD 10 may display, on the OLED panel 12, the image stored in the image storage section 32 (i.e., the corrected image 22 generated by the HMD 10) in a manner suppressing OLED deterioration at the time of image display according to the direction of user's line of sight detected by the detection section 50. For example, the display control section 34 may display, on the OLED panel 12, the corrected image 22 in a shifted manner as in the second embodiment.

Also, the display control section 34 may display, on the OLED panel 12, a portion (hereinafter also referred to as "a portion of non-interest") of the corrected image 22 generated by the PC 40, to be displayed in the region of the OLED panel 12 not viewed by the user in a manner suppressing OLED deterioration at the time of image display. In the description given below, a portion of the corrected image 22 to be displayed in the region of the OLED panel 12 viewed by the user will also be referred to as a "portion of interest." For example, the display control section 34 may not shift the display position of the portion of interest of the corrected image 22 and shift the display position of only the portion of non-interest of the corrected image 22.

As another mode of the second modification example, the display control section 34 may display, in the region of the OLED panel 12 not viewed by the user, the portion of non-interest of the corrected image 22 with lower luminance than that with which the corrected image 22 should be displayed. On the other hand, the display control section 34 may suppress variation in luminance of the portion of interest of the corrected image 22.

As still another mode of the second modification example, the display control section 34 may smooth out the luminance of the portion of non-interest of the corrected image 22. For example, in the case where there is a pixel having a luminance value equal to or higher than a given value in the portion of non-interest of the corrected image 22, the luminance value of the pixel in question may be reduced below what it should be, and the luminance values of the surrounding pixels of the pixel in question may be increased beyond what they should be. This prevents the progress of deterioration of only specific OLEDs of the OLED panel 12.

As still another mode of the second modification example, the HMD 10 may further include a light emission track record storage section that stores light emission track record information indicating the luminance with which each of the plurality of regions (or may be the plurality of OLEDs; the same applies hereinafter) of the OLED panel 12 emitted light (was lit) in the past. The display control section 34 may refer to the light emission track record information and shift the display position of the corrected image 22 in such a manner as to smooth out the light emission track records of the plurality of regions in the case where there is a significant imbalance in light emission track records between the plurality of regions of the OLED panel 12 (in the case where the imbalance is equal to or greater than a given value). This may be used to avoid peaking of the luminance in the region with high light emission track records. Also, the display control section 34 may reduce the luminance value of the corrected image 22 displayed in the region with relatively high light emission track records below what it should be, i.e., the level determined by the corrected image 22.

Third Embodiment

Figure 7:
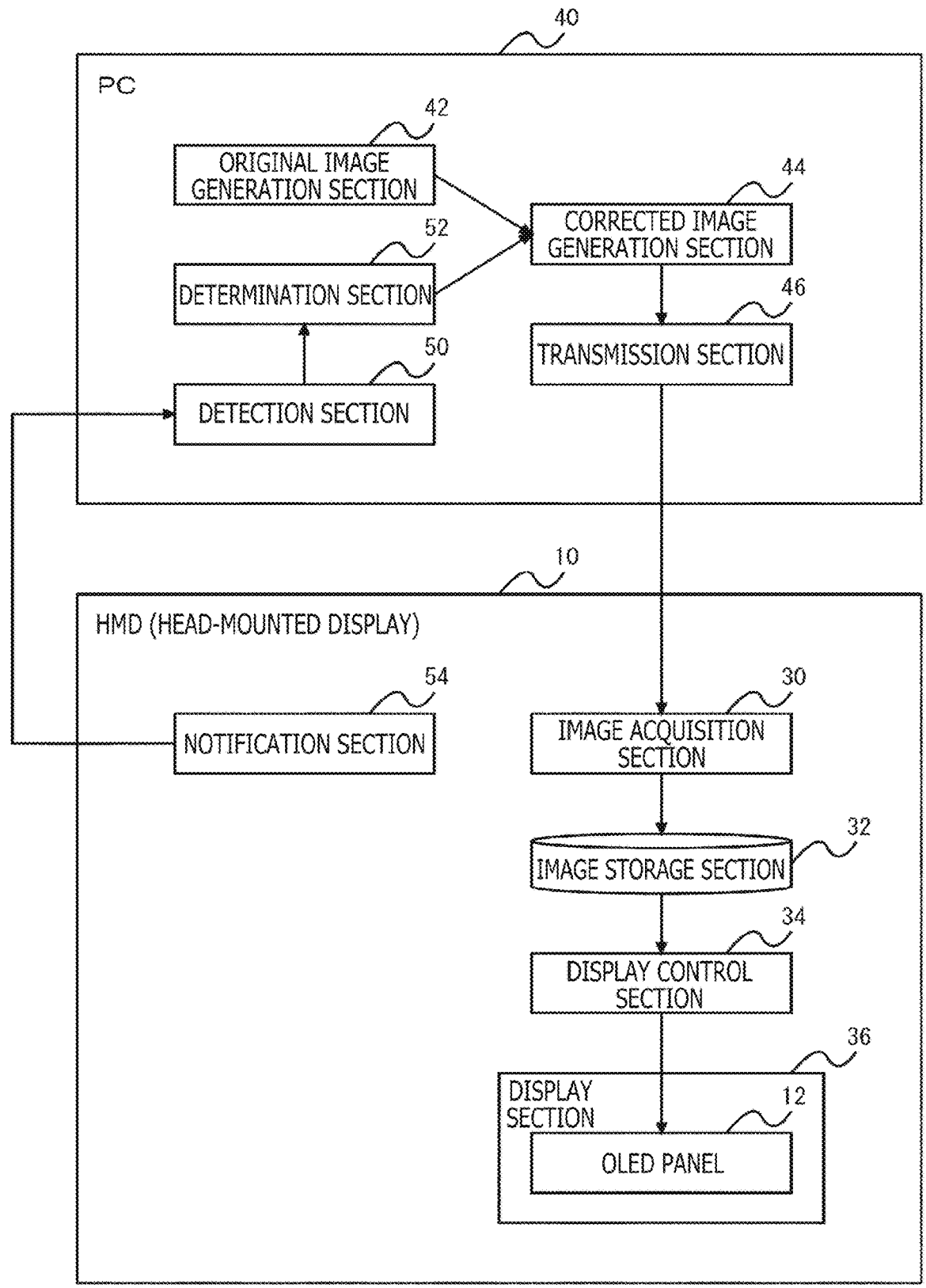
FIG. 7 is a diagram illustrating a configuration of the entertainment system of a third embodiment.

In a third embodiment, a description will also be given of another configuration for suppressing the deterioration of OLEDs of the HMD 10. FIG. 7 illustrates a configuration of the entertainment system 100 of a third embodiment. The entertainment system 100 of the third embodiment has a configuration analogous to the entertainment system 100 of the second embodiment. Of the components of the entertainment system 100 of the third embodiment, those identical or corresponding to the components of the entertainment system 100 of the second embodiment are denoted by the same reference numerals as the second embodiment. Also, redundant description of details that have already been described in the first or second embodiment will be omitted as appropriate.

The HMD 10 of the third embodiment basically has the configuration of the first embodiment and further includes a notification section 54 in addition to the configuration of the first embodiment. The notification section 54 sends, to the PC 40, a signal including at least one of (1) information regarding the operating state of the HMD 10, (2) information regarding the image displayed on the HMD 10, and (3) information regarding the state of the user using the HMD 10, on the basis of detection results of the sensor (not depicted) provided in the HMD 10.

The PC 40 of the third embodiment basically has the configuration of the first embodiment and further includes the detection section 50 and the determination section 52 included in the HMD 10 of the second embodiment. The detection section 50 detects at least one of (1) the operating state of the HMD 10, (2) the image displayed on the HMD 10, and (3) the state of the user using the HMD 10, on the basis of the signal sent from the HMD 10 and/or an image captured by a camera (not depicted) for imaging the HMD 10. In the embodiment, all three conditions (1) to (3) are detected.

The determination section 52 determines, according to the detection results of the detection section 50, whether or not each of the first image shifting condition regarding the operating state of the HMD 10, the second image shifting condition regarding the image displayed on the HMD 10, and the third image shifting condition regarding the state of the user using the HMD 10 is met. In the case where at least one of the first, second, and third image shifting conditions is met, the determination section 52 decides to perform the image shifting process. Examples of determination as to whether or not each condition is met have been already described. Therefore, the description thereof is omitted here.

If the determination section 52 does not decide to perform the image shifting process, the corrected image generation section 44 generates the corrected image 22 by performing the reverse distortion correction without shifting the original image 20 generated by the original image generation section 42. On the other hand, in the case where the determination section 52 decides to perform the image shifting process, the corrected image generation section 44 generates the corrected image 22 by performing, as a second processing section, the reverse distortion correction on an image obtained by shifting the original image 20 generated by the original image generation section 42 at the time of image generation.

The display control section 34 of the HMD 10 displays the image stored in the image storage section 32 at the display position where the image should be displayed. That is, in the third embodiment, the display control section 34 displays, on the OLED panel 12, the corrected image 22 generated by the PC 40 in an 'as-is' fashion without shifting the image.

The entertainment system 100 of the third embodiment can perform a process of suppressing the deterioration of OLEDs of the HMD 10 at a suitable timing as can the entertainment system 100 of the second embodiment. Also, the entertainment system 100 of the third embodiment allows for shifting of the original image 20 by any width (a width other than an integer multiple of one pixel) as in the first embodiment. For example, the corrected image 22 may be generated through the reverse distortion correction on the image obtained by shifting the original image 20 by a width of less than one pixel. This makes it less likely for the user to feel a sense of discomfort even in the case of low resolution of the OLED panel 12.

The present invention has been described above on the basis of the third embodiment. This third embodiment is illustrative, and it is understood by those skilled in the art that the combination of components and processes can be modified in various ways and that such modification examples also fall within the scope of the present invention.

A first modification example of the third embodiment will be described. In the case where the determination section 52 does not decide to perform the image shifting process, the display control section 34 may generate the corrected image 22 through the reverse distortion correction of the image obtained by shifting the original image 20 generated by the original image generation section 42 to a lesser extent than in the case where the determination section 52 decides to perform the image shifting process. For example, when the original image 20 is shifted by a width of one pixel in the case where the determination section 52 decides to perform the image shifting process, the original image 20 may be shifted by a width of one third (⅓) pixel in the case where the determination section 52 does not decide to perform the image shifting process.

A second modification example of the third embodiment will be described. The notification section 54 of the HMD 19 may send, to the PC 40, a signal including information regarding the direction of user's line of sight. For example, the HMD 10 may further include a camera for capturing images of the user's pupils, and the notification section 54 may send an image captured by the camera to the PC 40.

The detection section 50 of the PC 40 may detect the direction of user's line of sight by a known technique (e.g., Gaze Tracking technology) on the basis of the signal sent from the HMD 10 and may further detect other information associated with the direction of line of sight. For example, the detection section 50 may detect the direction of user's line of sight on the basis of the image captured by the camera. Also, the detection section 50 may detect blinking and shutting of eyes of the user on the basis of the image captured by the camera. Further, also, the detection section 50 may detect regions of the OLED panel 12 viewed by the user and/or those not viewed by the user according to the direction of user's line of sight.

The corrected image generation section 44 of the PC 40 may correct the original image 20 generated by the original image generation section 42 in a manner suppressing the deterioration of OLEDs of the HMD 10 at the time of image generation according to the direction of user's line of sight detected by the detection section 50. For example, the corrected image generation section 44 may generate the corrected image 22 through the reverse distortion correction of the image obtained by shifting the original image 20 generated by the original image generation section 42 as in the third embodiment.

Also, the corrected image generation section 44 may correct a portion (hereinafter also referred to as "a portion of non-interest") of the original image 20 generated by the original image generation section 42 to be displayed in the region of the OLED panel 12 not viewed by the user in a manner suppressing OLED deterioration at the time of image generation. In the description given below, a portion of the corrected image 22 to be displayed in the region of the OLED panel 12 viewed by the user will also be referred to as a "portion of interest."

For example, the PC 40 may store, in advance, the correspondence between the regions of the OLED panel 12 viewed by the user and the portions of the original image 20 and/or the correspondence between the regions of the OLED panel 12 not viewed by the user and the portions of the original image 20. The corrected image generation section 44 may generate the corrected image 22 by performing the reverse distortion correction in an 'as-is' fashion for the portions of interest of the original image 20. On the other hand, the corrected image generation section 44 may generate the corrected image 22 by performing the reverse distortion correction on the result of shifting the portions of non-interest.

As another mode of the second modification example, the PC 40 may store, in advance, the correspondence between the regions of the OLED panel 12 viewed by the user and the portions of the original image 20 and/or the correspondence between the regions of the OLED panel 12 not viewed by the user and the portions of the original image 20. The corrected image generation section 44 may reduce the luminance of the portions of non-interest below what it should be. On the other hand, the corrected image generation section 44 may suppress the variation in luminance of the portions of interest of the corrected image 22.

As still another mode of the second modification example, the corrected image generation section 44 may smooth out the luminance of the portions of non-interest of the corrected image 22. For example, in the case where there is a pixel having a luminance value equal to or higher than a given value in the portion of non-interest of the corrected image 22, the luminance value of the pixel in question may be reduced below what it should be, and the luminance values of the surrounding pixels of the pixel in question may be increased beyond what they should be. This prevents the progress of deterioration of only specific OLEDs of the OLED panel 12.

As still another mode of the second modification example, the PC 40 may further include a light emission track record storage section that stores light emission track record information indicating the luminance with which each of the plurality of regions (or may be the plurality of OLEDs; the same applies hereinafter) of the OLED panel 12 emitted light (was lit) in the past. The corrected image generation section 44 may refer to the light emission track record information and generate the result of shifting the original image 20 in such a manner as to smooth out the light emission track records of the plurality of regions in the case where there is an imbalance equal to or greater than a given value in light emission track records of the plurality of regions of the OLED panel 12. The corrected image generation section 44 may generate the corrected image by performing the reverse distortion correction on the result thereof. This may be used to avoid peaking of the luminance in the region with high light emission track records. Also, the corrected image generation section 44 may reduce the luminance value of the corrected image 22 displayed in the region with relatively high light emission track records below what it should be.

Fourth Embodiment

Figure 8:
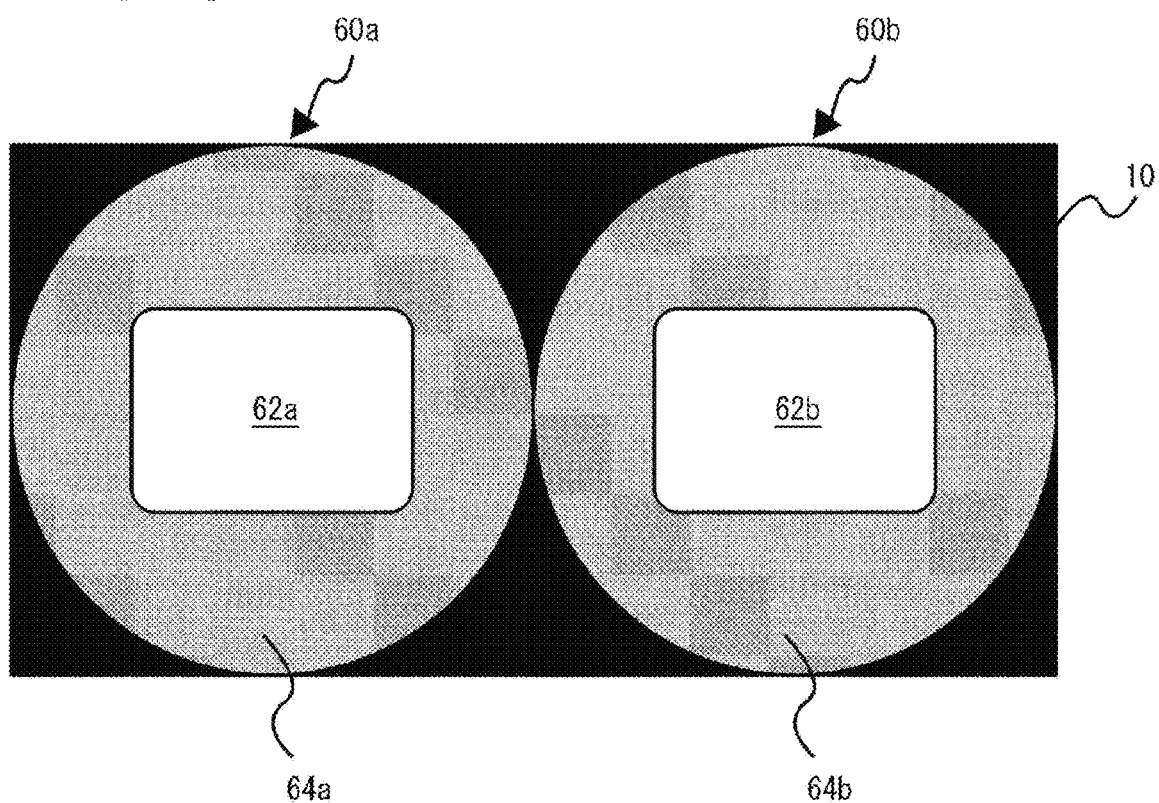
FIG. 8 is a diagram illustrating a display region of an HMD 10 illustrated in FIG. 2(b).

In a fourth embodiment, a description will be given of still another configuration for suppressing the deterioration of OLEDs of the HMD 10 that can be used in combination with the above first to third embodiments. FIG. 8 illustrates a display region of the HMD 10 illustrated in FIG. 2(b). A left display region 60a is a circular display region formed by the left OLED panel 12a and the left lens 14a and displays the left corrected image 22a. A right display region 60b is a circular display region formed by the right OLED panel 12b and the right lens 14b and displays the right corrected image 22b.

Here, some applications (e.g., a VR game application that runs on the PC 40) display a VR image whose luminance at a specific position is constantly '0' or low. For example, for the left corrected image 22a displayed in the left display region 60a, the luminance of a left closely-observed region 62a closely observed by the user wearing the HMD 10 may be set relatively high, and the luminance of a left non-closely-observed region 64a not closely observed by the user may be constantly set to '0' or low. In FIG. 8, the region in the vicinity of the center of the left display region 60a is the left closely-observed region 62a.

Similarly, for the right corrected image 22b displayed in the right display region 60b, the luminance of a right closely-observed region 62b may be set relatively high, and the luminance of a right non-closely-observed region 64b may be constantly set to '0' or low. In FIG. 8, the region in the vicinity of the center of the right display region 60b is the right closely-observed region 62b. The left non-closely-observed region 64a can be said to be a region other than the left closely-observed region 62a of the left display region 60a (or the left corrected image 22a). The right non-closely-observed region 64b can be said to be a region other than the right closely-observed region 62b of the right display region 60b (or the right corrected image 22b).

If the left corrected image 22a and the right corrected image 22b formed as described above are displayed for an extended period of time, the difference in luminance between the left closely-observed region 62a and the left non-closely-observed region 64a and between the right closely-observed region 62b and the right non-closely-observed region 64b remains for an extended period of time. This may lead to burn-in between the left OLED panel 12a and the right OLED panel 12b. For this reason, the PC 40 of the fourth embodiment adjusts the luminance of the left non-closely-observed region 64a and the right non-closely-observed region 64b according to the mean luminance (in other words, the luminance mean value) of the left closely-observed region 62a and the right closely-observed region 62b.

Specifically, the PC 40 further includes a closely observed region detection section (not depicted) that detects the left closely-observed region 62a, the left non-closely-observed region 64a, the right closely-observed region 62b, and the right non-closely-observed region 64b according to the direction of user's line of sight notified from the HMD 10. The closely observed detection section may detect the region of the left corrected image 22a that matches the direction of user's line of sight as the left non-closely-observed region 64a and detect the region of the right corrected image 22b that matches the direction of user's line of sight as the right non-closely-observed region 64b. Also, the PC 40 further includes a luminance measurement section that measures not only mean luminance of each of the left closely-observed region 62a and the left non-closely-observed region 64a of the left corrected image 22a but also mean luminance of each of the right closely-observed region 62b and the right non-closely-observed region 64b of the right corrected image 22b.

As described earlier, the corrected image generation section 44 of the PC 40 generates the left corrected image 22a and the right corrected image 22b as images to be displayed in the left display region 60a and the right display region 60b. In the fourth embodiment, in the case where the left closely-observed region 62a has relatively high mean luminance and the left non-closely-observed region 64a has relatively low mean luminance (the state illustrated in FIG. 8), the corrected image generation section 44 generates, at a given timing, the left corrected image 22a with the left closely-observed region 62a set to relatively low mean luminance and the left non-closely-observed region 64a set to relatively high mean luminance.

Similarly, in the case where the right closely-observed region 62b has relatively high mean luminance and the right non-closely-observed region 64b has relatively low mean luminance (the state illustrated in FIG. 8), the corrected image generation section 44 generates, at a given timing, the right corrected image 22b with the right closely-observed region 62b set to relatively low mean luminance and the right non-closely-observed region 64b set to relatively high mean luminance. The term "relatively high mean luminance" may also refer to a luminance value that is equal to or higher than a given high luminance threshold. Also, the term "relatively low mean luminance" may also refer to a luminance value that is lower than a given low luminance threshold.

Figure 9:
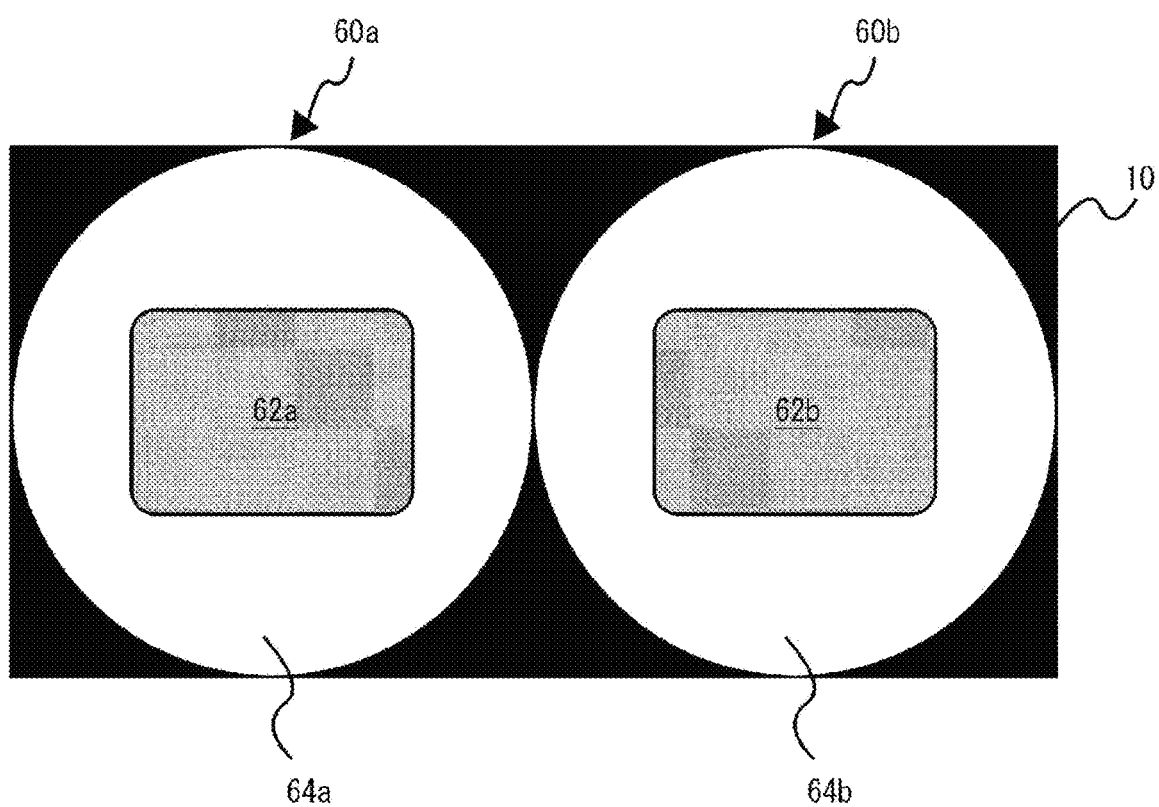
FIG. 9 is a diagram schematically illustrating a manner of display during luminance adjustment corresponding to FIG. 8.

FIG. 9 schematically illustrates a manner of display during luminance adjustment corresponding to FIG. 8. In the left corrected image 22a displayed in the left display region 60a illustrated in FIG. 9, the left closely-observed region 62a is set to relatively low luminance, and the left non-closely-observed region 64a is set to relatively high luminance. Also, in the right corrected image 22b displayed in the right display region 60b illustrated in FIG. 9, the right closely-observed region 62b is set to relatively low luminance, and the right non-closely-observed region 64b is set to relatively high luminance.

Conversely, in the case where the left closely-observed region 62a has relatively low mean luminance and the right non-closely-observed region 64b has relatively high mean luminance, the corrected image generation section 44 generates, at a given timing, the left corrected image 22a with the left closely-observed region 62a set to relatively high mean luminance and the left non-closely-observed region 64a set to relatively low mean luminance. Similarly, in the case where the right closely-observed region 62b has relatively low mean luminance and the right non-closely-observed region 64b has relatively high mean luminance, the corrected image generation section 44 generates, at a given timing, the right corrected image 22b with the right closely-observed region 62b set to relatively high mean luminance and the right non-closely-observed region 64b set to relatively low mean luminance.

The above given timing may be one of the number of frames, elapse of time, and whether or not the user is wearing the HMD 10, or a combination thereof. For example, in the case where the corrected image generation section 44 continuously displays a given number of frames of the left corrected image 22a and the right corrected image 22b that appear in the manner illustrated in FIG. 8 or for a given amount of time, the corrected image generation section 44 may, thereafter, generate the left corrected image 22a and the right corrected image 22b that appear in the manner illustrated in FIG. 9 and display these images on the HMD 10.

Also, the PC 40 may further include a detection section (e.g., the detection section 50 in the third embodiment) that detects whether or not the user is wearing the HMD 10. In the case where the corrected image generation section 44 of the PC 40 continuously generates the left corrected image 22a with the left closely-observed region 62a set to relatively high mean luminance and the left non-closely-observed region 64a set to relatively low mean luminance, and when it is detected that the user is not wearing the HMD 10, the corrected image generation section 44 may generate, for a certain period of time, the left corrected image 22a with the left closely-observed region 62a set to relatively low mean luminance and the left non-closely-observed region 64a set to relatively high mean luminance and display the left corrected image 22a on the HMD 10. The same is true for the right corrected image 22b.

Conversely, in the case where the corrected image generation section 44 continuously generates the left corrected image 22a with the left closely-observed region 62a set to relatively low mean luminance and the left non-closely-observed region 64a set to relatively high mean luminance, and when it is detected that the user is not wearing the HMD 10, the corrected image generation section 44 may generate, for a certain period of time, the left corrected image 22a with the left closely-observed region 62a set to relatively high mean luminance and the left non-closely-observed region 64a set to relatively low mean luminance and display the left corrected image 22a on the HMD 10. The same is true for the right corrected image 22b.

The configuration of the fourth embodiment can smooth out the mean illuminance of the left closely-observed region 62a and that of the left non-closely-observed region 64a, in other words, reduce the divergence in mean illuminance levels, over a certain period of time. Similarly, the mean illuminance of the right closely-observed region 62b and that of the right non-closely-observed region 64b can be smoothed out. This makes it easier to suppress burn-in on the left OLED panel 12a and the right OLED panel 12b. In other words, it is possible to prevent the progress of deterioration of only specific regions of the left OLED panel 12a and the right OLED panel 12b.

It should be noted that it is assumed, in the above examples, that there is a difference in luminance between the left closely-observed region 62a and the left non-closely-observed region 64a and that there is a difference in luminance between the right closely-observed region 62b and the right non-closely-observed region 64b. It should be noted, however, that the technology of the fourth embodiment is widely applicable to the case where there is a difference in luminance between a first region of the left display region 60a and a second region different from the first region for long hours and to the case where there is a difference in luminance between a first region of the right display region 60b and a second region different from the first region for long hours. The technology allows for smoothing out of the luminance across the left display region 60a and, similarly, smoothing out of the luminance across the right display region 60b, thus preventing the progress of deterioration of only specific regions of the left OLED panel 12a and the right OLED panel 12b as its advantageous effects.

Although functionality of an image generation apparatus is provided in the PC 40 in the first to fourth embodiments, such functionality may be provided in the HMD 10 as a modification example applicable to any one of the embodiments. That is, the HMD 10 may perform both the image generation process and the image display process. For example, the CPU and the GPU of the HMD 10 may further deliver functionality of the original image generation section 42 and the corrected image generation section 44 described in each of the embodiments. In this case, the corrected image generation section 44 of the HMD 10 may store the generated corrected image 22 in the image storage section 32.

Any combination of the embodiments and the modification examples described above is also useful as an embodiment of the present invention. A new embodiment resulting from the combination has the advantageous effects of the original embodiment and modification example. Also, it is understood by those skilled in the art that the functionality achieved by each of the components recited in the claims is realized by each of the components disclosed in the embodiments and modification examples alone or in coordination with other components. For example, the second processing section recited in the claims may be realized not only by either the display control section 34 of the HMD 10 or the corrected image generation section 44 of the PC 40 disclosed in the above embodiments and modification examples but also by the coordination between the display control section 34 of the HMD 10 and the corrected image generation section 44 of the PC 40.

REFERENCE SIGNS LIST

10 HMD, 12 OLED panel, 14 Lens, 34 Display control section, 36 Display section, 40 PC, 42 Original image generation section, 44 Corrected image generation section, 50 Detection section, 100 Entertainment system

INDUSTRIAL APPLICABILITY

The technology described in the present disclosure is applicable to a system that displays an image on a head-mounted display.

The invention claimed is:

1. An image generation apparatus that generates an image to be displayed on a head-mounted display, the head-mounted display including a display section including organic light emitting diodes and a lens adapted to enlarge an image displayed on the display section and present the enlarged image to a user, the image generation apparatus comprising:
a first generation section adapted to generate an image of a virtual space; and
a second generation section adapted to generate an image to be displayed on the display section by correcting an image obtained by shifting the image generated by the first generation section according to distortion caused by the lens.

2. The image generation apparatus of claim 1, wherein the second generation section changes a width by which to shift the image generated by the first generation section at a preset timing.

3. The image generation apparatus of claim 1, wherein the second generation section corrects the image obtained by shifting the image generated by the first generation section by a width of less than one pixel.

4. The image generation apparatus of claim 1, wherein the second generation section sets a pixel value of a certain position in the image generated by the first generation section as a pixel value of a position in a display image corresponding to a position moved in a direction of a shift from the certain position according to a correspondence determined in advance, according to distortion caused by the lens between the position in the image generated by the first generation section and the position in the display image displayed on the display section.

5. An image display system that displays an image on a head-mounted display, the head-mounted display including a display section that includes organic light emitting diodes, the image display system comprising: a first generation section adapted to generate an image of a virtual space; and a second generation section adapted to display the virtual space image on the display section, wherein the second generation section generates an image to be displayed on the display section by shifting, at a time of image generation, the image generated by the first generation section or displays the image generated by the first generation section on the display section in a shifted manner according to whether or not at least one of three conditions, that is, (1) an operating state of the head-mounted display, (2) an image displayed on the head-mounted display, and (3) a state of the user using the head-mounted display, is met.

6. The image display system of claim 5, wherein
the head-mounted display includes a lens adapted to enlarge an image displayed on the display section and present the enlarged image to a user, and
the second generation section generates an image to be displayed on the display section by correcting an image obtained by shifting the image generated by the first generation section according to distortion caused by the lens.

7. An image display system that displays an image on a head-mounted display, the head-mounted display including a display section that includes organic light emitting diodes, the image display system comprising: a detection section adapted to detect a direction of line of sight of a user wearing the head-mounted display; a first generation section adapted to generate an image of a virtual space; and a second generation section adapted to display the virtual space image on the display section, wherein the second generation section corrects, at a time of image generation, the image generated by the first generation section in a manner suppressing deterioration of the organic light emitting diodes according to the direction of user's line of sight detected by the detection section or displays the image generated by the first generation section on the display section in a manner suppressing deterioration of the organic light emitting diodes.

8. The image display system of claim 7, wherein the detection section further detects regions of the display section not viewed by the user according to the direction of user's line of sight, and the second generation section corrects, at the time of image generation, a portion to be displayed in the region of the display section not viewed by the user in a manner suppressing deterioration of the organic light emitting diodes in the image generated by the first generation section or displays, at the time of image display, the portion on the display section in a manner suppressing the deterioration of the organic light emitting diodes.

9. An image generation method that generates an image to be displayed on a head-mounted display, the head-mounted display including a display section that includes organic light emitting diodes and a lens adapted to enlarge an image displayed on the display section and present the enlarged image to a user, the image generation method comprising a computer to perform:
generating an image of a virtual space; and
generating an image to be displayed on the display section by correcting an image obtained by shifting the image generated by generating the image of the virtual space according to distortion caused by the lens.

* * * * *